US012613383B2

(12) United States Patent
Maki et al.

(10) Patent No.: US 12,613,383 B2
(45) Date of Patent: Apr. 28, 2026

(54) OPTICAL UNIT WITH ATTENUATING PORTION AND METHOD OF PRODUCING THE SAME

(71) Applicant: NALUX CO., LTD., Osaka (JP)

(72) Inventors: Hisashi Maki, Osaka (JP); Kairi Morozumi, Osaka (JP); Tetsuya Zenko, Osaka (JP); Hironori Horikiri, Osaka (JP); Takahiro Fujioka, Osaka (JP)

(73) Assignee: NALUX CO., LTD., Osaka (JP)

( * ) Notice: Subject to any disclaimer, the term of this patent is extended or adjusted under 35 U.S.C. 154(b) by 265 days.

(21) Appl. No.: 18/499,482

(22) Filed: Nov. 1, 2023

(65) Prior Publication Data

US 2024/0077687 A1 Mar. 7, 2024

Related U.S. Application Data

(63) Continuation of application No. PCT/JP2021/024699, filed on Jun. 30, 2021.

(51) Int. Cl.
G02B 6/42 (2006.01)
(52) U.S. Cl.
CPC ......... G02B 6/4206 (2013.01); G02B 6/4296 (2013.01)
(58) Field of Classification Search
None
See application file for complete search history.

(56) References Cited

U.S. PATENT DOCUMENTS

| | | | |
|---|---|---|---|
| 7,294,821 B2 * | 11/2007 | Ishigami | G02B 6/4249 |
| | | | 250/216 |
| 9,766,416 B1 * | 9/2017 | Kim | G02B 6/34 |
| 10,120,145 B2 * | 11/2018 | Tsuruta | G02B 6/42 |

(Continued)

FOREIGN PATENT DOCUMENTS

| | | |
|---|---|---|
| EP | 0 370 663 A2 | 5/1990 |
| EP | 1717607 A1 | 11/2006 |

(Continued)

OTHER PUBLICATIONS

International Search Report and Written Opinion dated Sep. 21, 2021 corresponding to International Patent Application No. PCT/JP2021/024699, with English translation.

(Continued)

*Primary Examiner* — Jerry Rahll
(74) *Attorney, Agent, or Firm* — SQUIRE PATTON BOGGS (US) LLP

(57) ABSTRACT

An optical unit of plastic provided with a surface for incident light and a surface for outgoing light, wherein the surface for incident light is designed to face a light source and the surface for outgoing light is designed to face an element for receiving light so as to optically connect the light source and the element for receiving light and wherein the optical unit is so shaped that light that comes from the light source and is incident on the surface for incident light forms a first image of the light source within the optical unit and a second image of the light source after having gone through the surface for outgoing light and the optical unit is provided with an attenuating portion for attenuating the quantity of light passing therethrough in the vicinity of the position where the first image is formed.

7 Claims, 9 Drawing Sheets

(56)    References Cited

U.S. PATENT DOCUMENTS

| | | | |
|---|---|---|---|
| 2008/0138091 A1 | 6/2008 | Shimoguchi | |
| 2009/0189127 A1 | 7/2009 | Nakamura et al. | |
| 2018/0177404 A1 | 6/2018 | Liu | |
| 2021/0286141 A1* | 9/2021 | Mikami | ............... G02B 6/4266 |

FOREIGN PATENT DOCUMENTS

| | | | |
|---|---|---|---|
| JP | 54-127340 | A | 10/1979 |
| JP | 02-244012 | A | 9/1990 |
| JP | 11-119063 | A | 4/1999 |
| JP | 2001-264586 | A | 9/2001 |
| JP | 2008-145678 | A | 6/2008 |
| JP | 2008-268755 | A | 11/2008 |
| JP | 2014167605 | A | 9/2014 |
| JP | 2020129063 | A | 8/2020 |
| WO | 2005081019 | A1 | 9/2005 |
| WO | 2006054462 | A1 | 5/2006 |
| WO | 2016/210132 | A1 | 12/2016 |
| WO | 2020/100283 | A1 | 5/2020 |

OTHER PUBLICATIONS

Office action dated Dec. 4, 2024, corresponding to Japanese Patent
Application No. 2023-531224, with English translation thereof.

* cited by examiner

FIG. 17

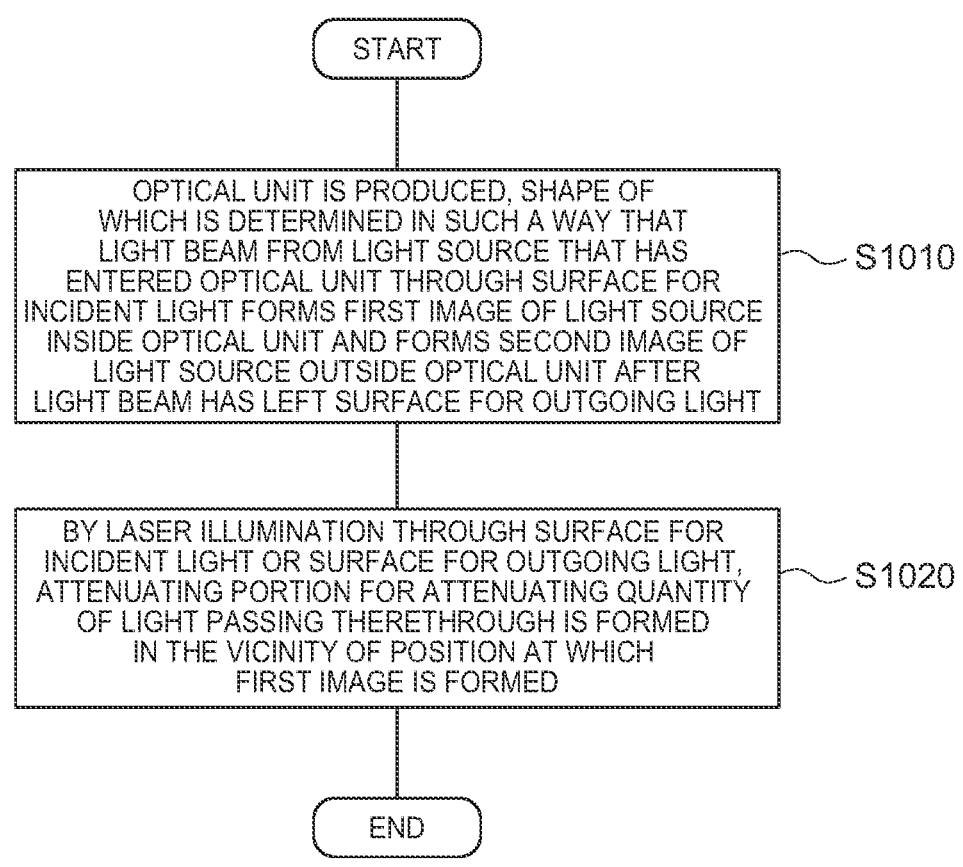

START

OPTICAL UNIT IS PRODUCED, SHAPE OF
WHICH IS DETERMINED IN SUCH A WAY THAT
LIGHT BEAM FROM LIGHT SOURCE THAT HAS
ENTERED OPTICAL UNIT THROUGH SURFACE FOR
INCIDENT LIGHT FORMS FIRST IMAGE OF LIGHT SOURCE
INSIDE OPTICAL UNIT AND FORMS SECOND IMAGE OF
LIGHT SOURCE OUTSIDE OPTICAL UNIT AFTER
LIGHT BEAM HAS LEFT SURFACE FOR OUTGOING LIGHT        S1010

BY LASER ILLUMINATION THROUGH SURFACE FOR
INCIDENT LIGHT OR SURFACE FOR OUTGOING LIGHT,
ATTENUATING PORTION FOR ATTENUATING QUANTITY
OF LIGHT PASSING THERETHROUGH IS FORMED
IN THE VICINITY OF POSITION AT WHICH
FIRST IMAGE IS FORMED        S1020

END

FIG. 18

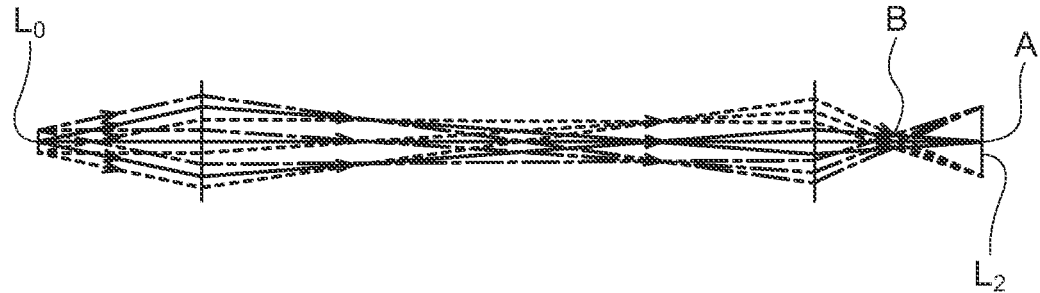

1

OPTICAL UNIT WITH ATTENUATING PORTION AND METHOD OF PRODUCING THE SAME

CROSS REFERENCE TO RELATED APPLICATION

This is a Continuation of International Patent Application No. PCT/JP2021/024699 filed Jun. 30, 2021, which designates the U.S. The contents of this application is hereby incorporated by reference.

TECHNICAL FIELD

The present invention relates to an optical unit provided with an attenuating portion and a method of producing the same.

BACKGROUND ART

In the field of optical communication, optical units (modules for optical use) for optically connecting an element for providing light and an element for receiving light are used. In some cases, such optical units are required to attenuate the quantity of light to be transmitted therethrough with a desired attenuation factor. In order to attenuate the quantity of light with a desired attenuation factor, an optical unit provided with a film for light-attenuation on a surface through which light passes (Patent document 1), an optical unit provided with a light diffusing device therein ((Patent document 2) and the like have been developed.

In order to produce an optical unit provided with a film, however, more manpower and costs are required. In the case of an optical unit provided with a light diffusing device therein, greater noises can be caused by the diffused light. Further, in both cases a desired attenuation factor can hardly be realized with a high degree of accuracy.

Thus, an optical unit for optically connecting an element for providing light functioning as a light source and an element for receiving light, the optical unit being easy to produce and realizing a desired attenuation factor with a high degree of accuracy, has not been developed. Accordingly, there is a need for an optical unit for optically connecting an element for providing light, the element functioning as a light source, and an element for receiving light, the optical unit being easy to produce and realizing a desired attenuation factor with a high degree of accuracy, and a method of producing the same.

PATENT DOCUMENTS

Patent document 1: JPH11119063 (A)
Patent document 2: JP2008145678 (A)

The object of the present invention is to provide an optical unit for optically connecting an element for providing light, the element functioning as a light source, and an element for receiving light, the optical unit being easy to produce and realizing a desired attenuation factor with a high degree of accuracy, and a method of producing the same.

SUMMARY OF THE INVENTION

An optical unit according to a first aspect of the present invention is an optical unit of plastic provided with a surface for incident light and a surface for outgoing light, wherein the surface for incident light is designed to face a light source and the surface for outgoing light is designed to face an element for receiving light so as to optically connect the light source and the element for receiving light, the light coming from the light source. The optical unit is so shaped that light that comes from the light source and is incident on the surface for incident light forms a first image of the light source within the optical unit and a second image of the light source after having gone through the surface for outgoing light and the optical unit is provided with an attenuating portion for attenuating the quantity of light passing therethrough with a desired attenuation factor in a range from $-0.5$ dB to $-6.0$ dB in the vicinity of the position where the first image is formed.

The optical unit according to the present aspect optically connects an element for providing light, the element functioning as a light source, and an element for receiving light. The optical unit is easy to produce and realizes a desired attenuation factor with a high degree of accuracy.

In the optical unit according to a first embodiment of the first aspect of the present invention, at least one of the surface for incident light and the surface for outgoing light is designed to face an optical fiber through a ferrule.

In the optical unit according to a second embodiment of the first aspect of the present invention, the relationships $$0 < f_1 < a,$$

$$0 < f_2 < d$$

and $$1 > \frac{naf_1}{a - f_1}$$

are satisfied, where a path of a ray of light passing through the center of the surface for incident light and the center of the surface for outgoing light is defined as an optical axis, a distance along the optical axis in design between the light source and the surface for incident light is represented by a, a distance along the optical axis in design between the surface for incident light and the surface for outgoing light is represented by 1, a distance along the optical axis in design between the surface for outgoing light and the second image of the light is represented by d, a focal length of the surface for incident light on the side of the light source is represented by $f_1$, a focal length of the surface for outgoing light on the side of the element for receiving light is represented by $f_2$ and a refractive index of the optical unit is represented by n.

A method of producing an optical unit according to a second aspect of the present invention is devised to produce an optical unit provided with a surface for incident light, a surface for outgoing light and an attenuating portion therein, wherein the surface for incident light is designed to face a light source and the surface for outgoing light is designed to face an element for receiving light so as to optically connect the light source and the element for receiving light, the light coming from the light source. The method includes: shaping the optical unit in such a way that light that comes from the light source and is incident on the surface for incident light forms a first image of the light source within the optical unit and a second image of the light source after having gone through the surface for outgoing light and forming the attenuating portion for attenuating the quantity of light passing therethrough in the vicinity of the position where the first image is formed by laser illumination carried out through the surface for incident light or the surface for outgoing light.

By the method of producing an optical unit according to the present aspect, an optical unit that realizes a desired attenuation factor with a high degree of accuracy can be easily produced.

In the method of producing an optical unit according to a first embodiment of the second aspect of the present invention, at least one of the surface for incident light and the surface for outgoing light is designed to face an optical fiber through a ferrule and when forming the attenuating portion, the laser illumination is carried out through the ferrule and the surface for incident light or the surface for outgoing light.

According to the present embodiment, when forming the attenuating portion, a position to be illuminated by the laser can be determined with a high degree of accuracy by the use of the ferrule.

In the method of producing an optical unit according to a second embodiment of the second aspect of the present invention, the optical unit is an optical unit for reception and when forming the attenuating portion, the laser illumination is carried out through the surface for incident light by a fiber laser placed at the position of an optical fiber in operation.

According to the present embodiment, when forming the attenuating portion, the laser illumination is carried out through the surface for incident light by a fiber laser placed at the position of an optical fiber in operation and therefore the attenuating portion can be formed substantially at the position of the first image.

In the method of producing an optical unit according to a third embodiment of the second aspect of the present invention, the optical unit is an optical unit for transmission and when forming the attenuating portion, the laser illumination is carried out through the surface for outgoing light by a fiber laser placed substantially at the position of the second image in operation.

According to the present embodiment, when forming the attenuating portion, the laser illumination is carried out through the surface for outgoing light by a fiber laser placed substantially at the position of the second image in operation and therefore the attenuating portion can be formed substantially at the position of the first image.

BRIEF DESCRIPTION OF DRAWINGS

FIG. 17 is a flowchart for describing a method of producing an optical unit provided with a surface for incident light designed to face a light source and a surface for outgoing light designed to face an element for receiving light so as to optically connect the light source and the element for receiving light from the light source and further provided with an attenuating portion that attenuates the quantity of light passing therethrough; and FIG. 18 shows an optical system including an optical unit in operation.

DESCRIPTION OF EMBODIMENTS

Figure 1:
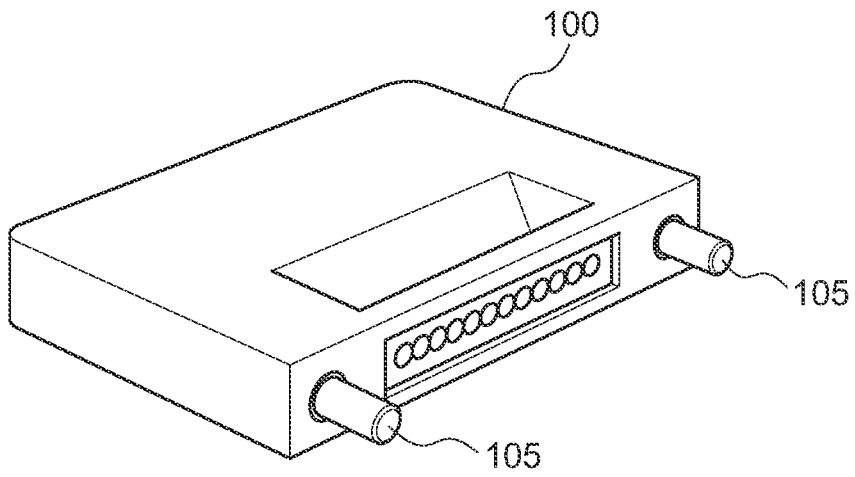
FIG. 1 is a perspective view of an optical unit 100 according to an embodiment of the present invention.

FIG. 1 is a perspective view of an optical unit 100 according to an embodiment of the present invention. The optical unit is also referred to as a coupling lens, a connector lens, a lens array, an optical module lens, an optical receptacle and an optical element.

Figure 2:
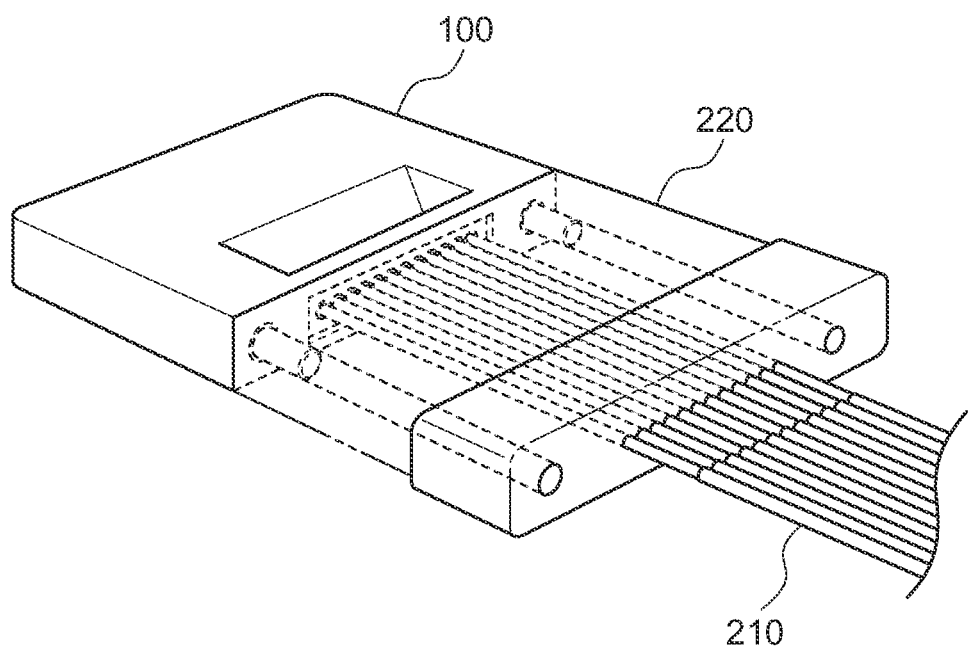
FIG. 2 is a perspective view of the optical unit 100 according to the embodiment of the present invention, optical fibers 210 and a ferrule 220 used to optically connect the optical unit 100 and the optical fibers 210.

FIG. 2 is a perspective view of the optical unit 100 according to the embodiment of the present invention, optical fibers 210 and a ferrule 220 used to optically connect the optical unit 100 and the optical fibers 210.

Figure 3:
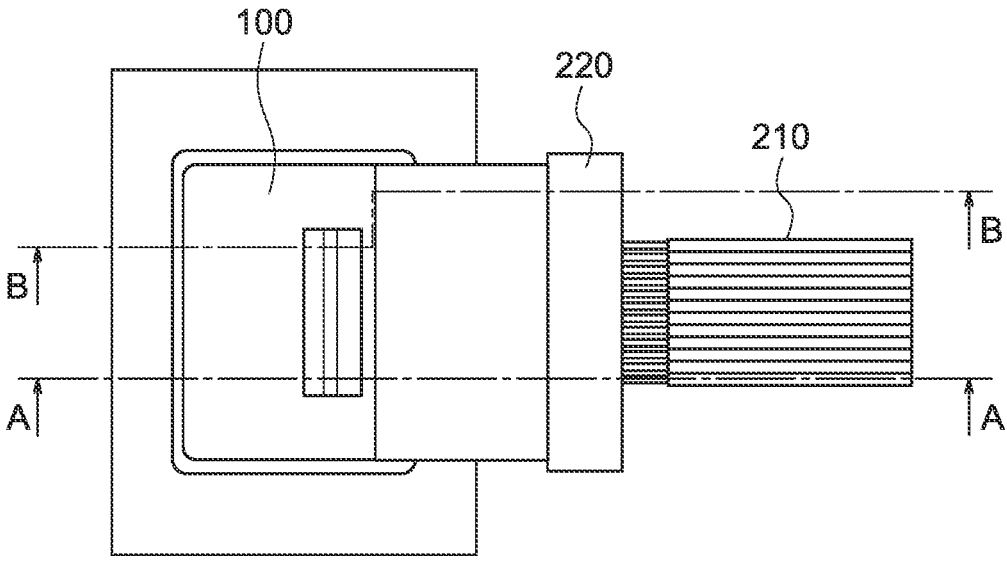
FIG. 3 is a plan view of the optical unit 100, the optical fibers 210 and the ferrule 220 used to optically connect the optical unit 100 and the optical fibers 210, the plan view corresponding to the perspective view shown in FIG. 2.

FIG. 3 is a plan view of the optical unit 100, the optical fibers 210 and the ferrule 220 used to optically connect the optical unit 100 and the optical fibers 210, the plan view corresponding to the perspective view shown in FIG. 2.

Figure 4:
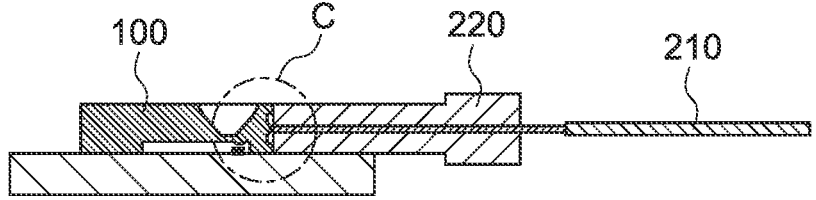
FIG. 4 shows a A-A cross section in FIG. 3.

FIG. 4 shows a A-A cross section in FIG. 3.

Figure 5:
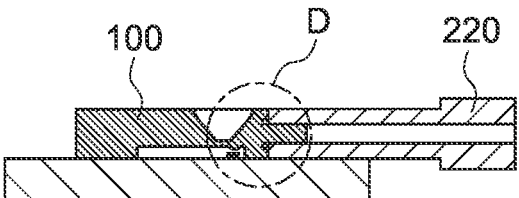
FIG. 5 shows a B-B cross section in FIG. 3.

FIG. 5 shows a B-B cross section in FIG. 3.

Figure 6:
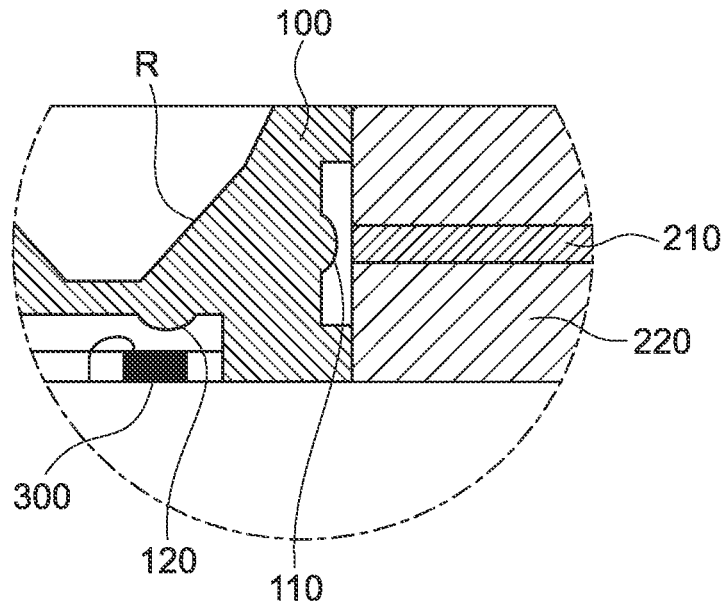
FIG. 6 is an enlarged view of the portion marked with C in FIG. 4.

FIG. 6 is an enlarged view of the portion marked with C in FIG. 4. According to FIG. 6, a lens for incident light 110 of the optical unit 100 is placed to face an optical fiber 210 and a lens for outgoing light 120 of the optical unit 100 is placed to face an element for receiving light 300. Light that has been provided by the optical fiber 210 and has entered the lens for incident light 110 is reflected by a total reflection surface R and made to converge in the neighborhood of a light-receiving surface of the element for light receiving 300 by the lens for outgoing light 120. A set of lenses for incident light 110 constitute an array of lenses for incident light and a set of lenses for outgoing light 120 constitute an array of lenses for outgoing light. Light provided by one of the plural optical fibers passes through one of the lenses for incident light corresponding to the above-described one of optical fibers and one of the lenses for outgoing light corresponding to the above-described one of the lenses for incident light and reaches an element for receiving light corresponding to the above-described one of the lenses for outgoing light. A lens for incident light and a lens for outgoing light are also referred to respectively as a surface for incident light and a surface for outgoing light of the optical unit.

Figure 7:
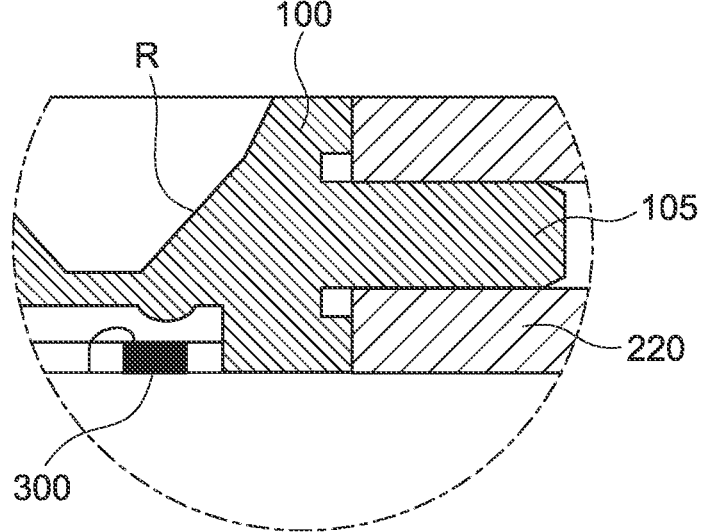
FIG. 7 is an enlarged view of the portion marked with D in FIG. 5.

FIG. 7 is an enlarged view of the portion marked with D in FIG. 5. According to FIG. 7, a proper fixture is made to hold the optical unit 100 and the ferrule 220 in alignment by inserting pins for ferrule-fitting 105 of the optical unit 100 into holes of the ferrule 220. As a result, each optical fiber 210 and each surface for incident light 110 are aligned to each other with a high degree of accuracy.

In general, an optical unit 100 according to the present invention is designed to optically connect a light source and an element for receiving light. When the optical unit 100 is used for transmission, the light source is a semiconductor optical element such as a VCSEL (Vertical Cavity Surface Emitting LASER) and the element for receiving light is an optical fiber. When the optical unit 100 is used for reception, the light source is an optical fiber and the element for receiving light is a semiconductor optical element such as a photodiode.

The optical unit described using FIGS. 1-6 is an optical unit for reception. When the optical unit 100 is used for transmission, each surface for incident light faces a semiconductor optical element such as a VCSEL functioning as a light source and each surface for outgoing light faces an end surface of an optical fiber functioning as a element for receiving light.

Features of an optical system including an optical unit according to the present invention will be described using a paraxial model of an imaging optical system. As described above, each surface for incident light of the optical unit faces a light source and each surface for outgoing light of the optical unit faces an element for light receiving.

Figure 8:
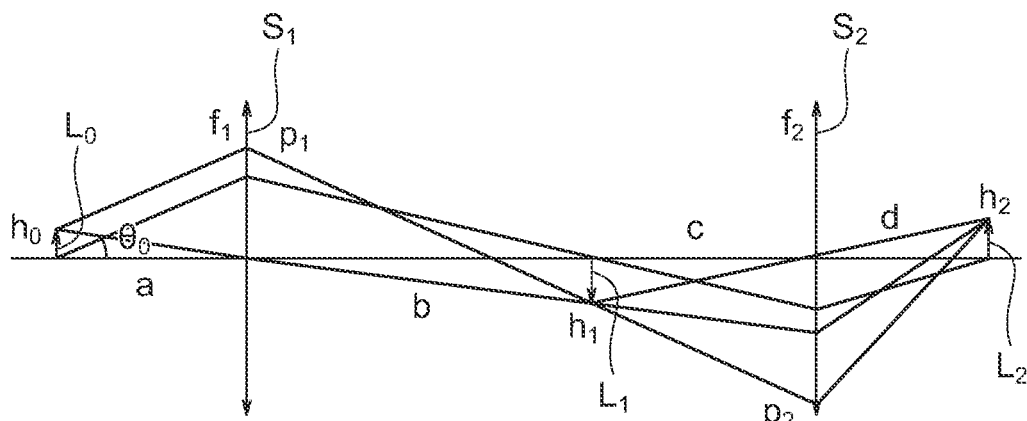
FIG. 8 shows a paraxial model of an imaging optical system including an optical unit according to the present invention.

FIG. 8 shows a paraxial model of an imaging optical system including an optical unit according to the present invention. The optical system including the optical unit is configured such that a first image $L_1$ of a light source $L_0$ is formed inside the optical unit and a second image $L_2$ of the light source $L_0$ is formed outside the optical unit. The path of the ray of light passing through the center of the light source $L_0$, the center of a surface for incident light $S_1$ and the center of a surface for outgoing light $S_2$ is defined as the optical axis. In FIG. 8, the upper half above the optical axis or the lower half below the optical axis alone of each of the light source and its images is shown.

The following conditions must be satisfied in order to configure the optical system in such a way that the first image $L_1$ of the light source $L_0$ is formed inside the optical unit and the second image $L_2$ of the light source $L_0$ is formed outside the optical unit.

$$0 < f_1 < a \tag{1}$$

$$0 < f_2 < d \tag{2}$$

$$b + c > \frac{naf_1}{a - f_1} \tag{3}$$

Description of the symbols are given below.
a: a distance along the optical axis between the light source $L_0$ and the surface for incident light $S_1$ b: a distance along the optical axis between the surface for incident light $S_1$ and the first image $L_1$
c: a distance along the optical axis between the first image $L_1$ and the surface for outgoing light $S_2$
d: a distance along the optical axis between the surface for outgoing light $S_2$ and the second image $L_2$
n: a refractive index of the optical unit
$f_1$: a focal length of the surface for incident light $S_1$
$f_2$: a focal length of the surface for outgoing light $S_2$ The condition necessary to keep a light beam within the surface for outgoing light $S_2$ will be described below. In order to keep a light beam within the surface for outgoing light $S_2$, the optical system must satisfy the following condition.

$$p_2 < \frac{D}{2}$$

On the other hand, it is clear from FIG. 8 that the following relationships hold.

$$p_1 = h_0 + a\theta_0$$

$$p_2 = h_1 + \frac{c}{b}(p_1 + h_1)$$

Using the expressions described above, the following expression can be obtained as the condition necessary to keep a light beam within the surface for outgoing light $S_2$.

$$\frac{c}{b} < \frac{\frac{D}{2} - \frac{b}{a}h_0}{a\theta_0 + h_0 + \frac{b}{a}h_0} \tag{4}$$

Description of the symbols are given below.
$p_1$: a radius of a light beam at the surface for incident light $S_1$
$p_2$: a radius of a light beam at the surface for outgoing light $S_2$
$h_0$: the maximum height of the light source $L_0$ from the optical axis
$h_1$: the maximum height of the first image $L_1$ from the optical axis
D: an effective diameter of the surface for outgoing light $S_2$
$\theta_0$: a beam divergence of the light source (a half angle in radian)

When the condition necessary to keep a light beam within the surface for outgoing light $S_2$ is considered with the principal ray alone, the following expression can be obtained.

$$\frac{b + c}{a}h_0 < \frac{D}{2}$$

Using the expression described above, the following expression can be obtained as the condition necessary to keep a light beam within the surface for outgoing light $S_2$.

$$c < \frac{aD}{2h_0} - b \tag{5}$$

Assuming that an element for receiving light is an optical fiber, the condition necessary to keep a light beam within an end surface of the optical fiber will be described below. In order to keep a light beam within the end surface of the optical fiber, the optical system must satisfy the following condition provided that the second image $L_2$ of the light source $L_0$ is formed on the end surface of the optical fiber.

$$h_2 < h_{core}$$

On the other hand, it is clear from FIG. 8 that the following relationship holds.

$$\frac{h_2}{h_0} = \frac{bd}{ac}$$ (15)

Using the expressions described above, the following expression can be obtained as the condition necessary to keep a light beam within the end surface of the optical fiber.

$$\frac{c}{b} > \frac{d}{a}\frac{h_0}{h_{core}}$$ (6)

Description of the symbols are given below.

$h_2$: the maximum height of the second image $L_2$ from the optical axis hcore: a radius of the core of the fiber From Expressions (4) and (6), in order to keep a light beam within the surface for outgoing light and the end surface of the optical fiber, the following condition must be satisfied.

$$\frac{d}{a}\frac{h_0}{h_{core}} < \frac{c}{b} < \frac{\frac{D}{2} - \frac{b}{a}h_0}{a\theta_0 + h_0 + \frac{b}{a}h_0}$$ (7)

When an expression that is obtained by replacing the radius of the core of the fiber with a radius of a circular surface for receiving light of an element for receiving light is satisfied, a light beam is kept within the surface for receiving light of the element for receiving light.

Further, it is clear from FIG. 8 that the following relationship holds when an angle between the principal ray that reaches the maximum image height and the optical axis is represented by a.

$$\tan\alpha = \frac{\frac{b+c}{a}h_0 + h_2}{d}$$

In consideration of the relationship $$\frac{h_2}{h_0} = \frac{bd}{ac}$$

the following relationship must be hold in order to avoid a loss at the optical fiber when the numerical aperture of the optical fiber is represented by NA.

$$b + c + \frac{bd}{c} < \frac{adNA}{h_0}$$ (8)

Examples of the present invention will be described below. The shape of each lens surface of the examples is defined by the following expression.

$$sag = \frac{c_0 r^2}{1 + \sqrt{1 - (1 + k)c_0^2 r^2}}$$

Description of the symbols are given below.

Sag: an amount of a sag, that is, a distance in the optical direction between a point and the vertex The sag is negative when the point is closer to the object than the vertex of the lens and positive when the point is closer to the image than the vertex of the lens.

$C_0$: a curvature (the inverse number of a radius of curvature)

r: a distance from the optical axis k: a conic constant

Example 1

Figure 9:
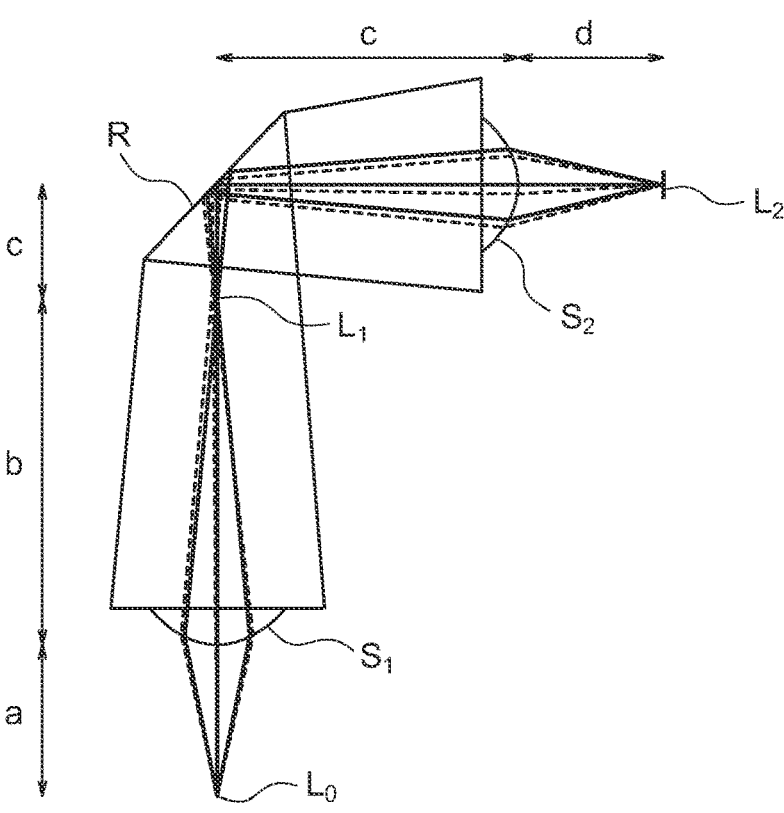
FIG. 9 shows optical paths passing through the optical unit of the Example 1 in operation.

FIG. 9 shows optical paths passing through the optical unit of the Example 1 in operation. The optical unit of the Example 1 is provided with a surface for incident light $S_1$ designed to face a light source $L_0$ and a surface for outgoing light $S_2$ designed to face an element for receiving light so as to optically connect the light source $L_0$ and the element for receiving light. The optical unit of the Example 1 is an optical unit for transmission. The light source is a VCSEL and the element for receiving light is an optical fiber. The optical unit of the Example 1 is provided with a reflecting surface R therein. A light beam emitted by the VCSEL forms an image (a first image) $L_1$ of the light source inside the optical unit, is then reflected by the reflecting surface R, passes through the surface for outgoing light $S_2$ and then forms an image (a second image) $L_2$ of the light source $L_0$ in the vicinity of an end surface of the optical fiber. In the optical system shown in FIG. 9, the plane of the light source $L_0$ and the plane of the second image $L_2$ are conjugate to each other. In FIG. 9 the solid line represents a ray of light emitted at the center of the light source and the broken line represents a ray of light emitted at the point that is 5 μm away from the center of the light source.

Table 1 shows numerical data used in Expressions (1) to (8) for the optical system of Example 1. The unit of length in Table 1 is millimeter. Further, since a paraxial model of the imaging optical system is employed, the value of sine (sin $\theta_0$) is substantially equal to the value of angle ($\theta_0$) in radian.

TABLE 1

| Item | |
| --- | --- |
| a | 0.284 |
| b | 0.686 |
| c | 0.742 |
| d | 0.288 |
| f1 | 0.171 |
| f2 | 0.176 |
| n | 1.639 |
| sin θ0 | 0.2 |
| NA | 0.2 |

TABLE 1-continued

| Item | |
|---|---|
| h0 | 0.005 |
| D | 0.250 |
| hcore | 0.025 |

According to Table 1, Expressions (1) to (3), Expression (7) and Expression (8) are satisfied.

Table 2 shows the shape of each surface, distances between adjacent surfaces and material and a refractive index of each lens of Example 1.

TABLE 2

| | Shape of surface | Radius of curvature [mm] | Cornic constant k | Diameter [mm] | Distance between surafces [mm] | Material | Refractive index n |
|---|---|---|---|---|---|---|---|
| Object surface (Light source L0) | Plano | — | — | 0.010 (2 h 0) | 0.284 | Air | 1.000 |
| Surface for incident light S1 | Aspherical | 0.109 | −1.262 | 0.250 | 0.866 | PEI | 1.639 |
| Reflecting surface R | Plano surface inclining 45 degrees | — | — | — | 0.562 | PEI | 1.639 |
| Surface for outgoing light S2 | Aspherical | −0.112 | −1.462 | 0.250 (D) | 0.288 | Air | 1.000 |
| Image plane (End surface of optical fiber) | Plano | — | — | 0.050 (2 hcore) | — | — | — |

In Table 2 and Table 4 given later, PEI represents polyetherimide.

How an attenuating portion is formed in the optical unit will be described below. When forming an attenuating portion, the optical unit for transmission is illuminated with a high-power laser beam of a fiber laser or the like from the surface for outgoing light $S_2$ in operation through a ferrule. Since the surface for outgoing light $S_2$ of the optical unit for transmission is designed so as to be connected to an optical fiber through a ferrule in operation, the ferrule used in operation can be used for a fiber laser without any further adjustment when forming the attenuating portion. Thus, alignment of the light source of a high-power laser beam such as a fiber laser with the optical unit can be carried out with a high degree of accuracy.

Figure 10:
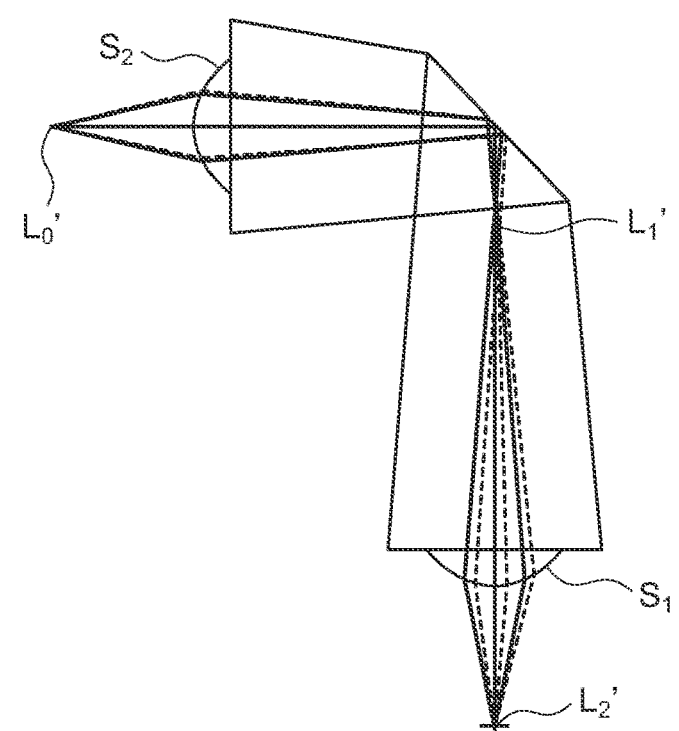
FIG. 10 shows optical paths passing through the optical unit of the Example 1 in a state in which an attenuating portion is formed.

FIG. 10 shows optical paths passing through the optical unit of the Example 1 in a state in which an attenuating portion is formed. In the optical system shown in FIG. 10, a light source $L_0'$ such as a fiber laser is placed substantially at the position of the second image of the optical system shown in FIG. 9. Since in the optical system shown in FIG. 9, the plane of the light source and the plane of the second image are conjugate to each other as described above, in the optical system shown in FIG. 10, an image $L_1'$ of the light source for a high-power laser beam is formed substantially at the position of the first image of the optical system shown in FIG. 9. Accordingly, synthetic resin (plastic) at the position where the image of the light source for the high-power laser beam is formed undergoes a change in refractive index or transmittance so that an attenuating portion is formed. In FIG. 10 the solid line represents a ray of light emitted at the center of the light source and the broken line represents a ray of light emitted at the point that is 5 μm away from the center of the light source.

Figure 11:
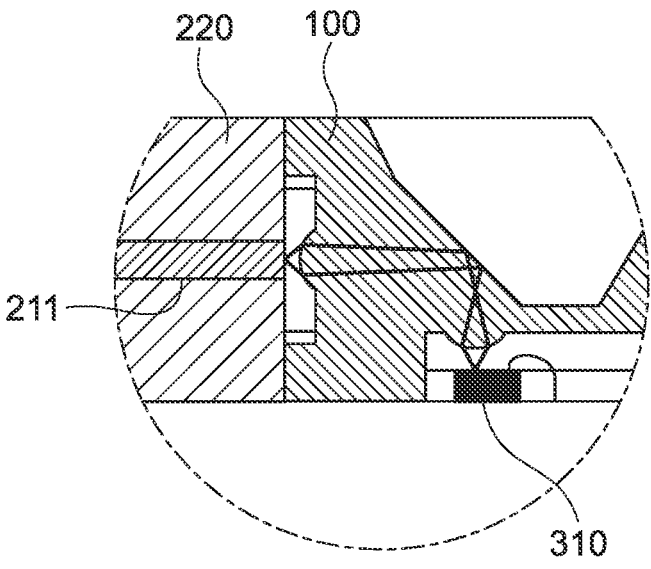
FIG. 11 shows an example of a cross section containing optical paths passing through an optical unit provided with a reflecting surface like the optical unit of Example 1.

FIG. 11 shows an example of a cross section containing optical paths passing through an optical unit provided with a reflecting surface like the optical unit of Example 1. In FIG. 11 the intensity of a laser beam that has been emitted by a fiber laser 211 and has passed through the optical unit 100 is measured by a photodiode 310.

Figure 12:
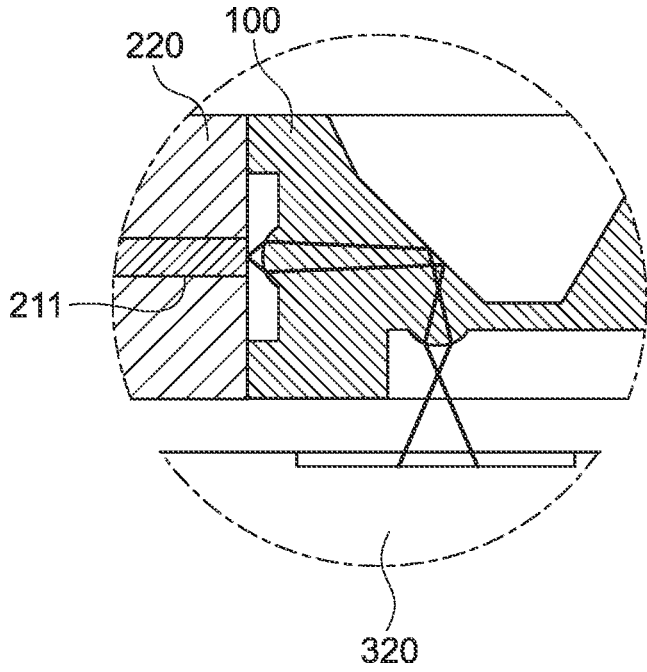
FIG. 12 shows another example of a cross section containing optical paths passing through an optical unit provided with a reflecting surface like the optical unit of Example 1.

FIG. 12 shows another example of a cross section containing optical paths passing through an optical unit provided with a reflecting surface like the optical unit of Example 1. In FIG. 12, the intensity of a laser beam that has been emitted by a fiber laser 211 and has passed through the optical unit 100 is measured by a power meter 320.

In a state shown in each of FIG. 11 and FIG. 12, by adjusting at least one of the intensity and the illumination time of the fiber laser 211 an attenuating portion with a desired attenuation factor can be formed.

When the first image in the optical unit is formed in the vicinity of the reflecting surface, an optical path can pass through the attenuating portion twice so that an amount of attenuation of light can be excessive. Further, when a diameter of a light beam at the reflecting surface is small, form error at a local area on the reflecting surface R, onto the area the light beam being incident, can remarkably deteriorate the optical performance. Accordingly, the first image in the optical unit should preferably be formed away from the reflecting surface R at least by a length of the height $h_1$ of the first image $L_1$.

Example 2

Figure 13:
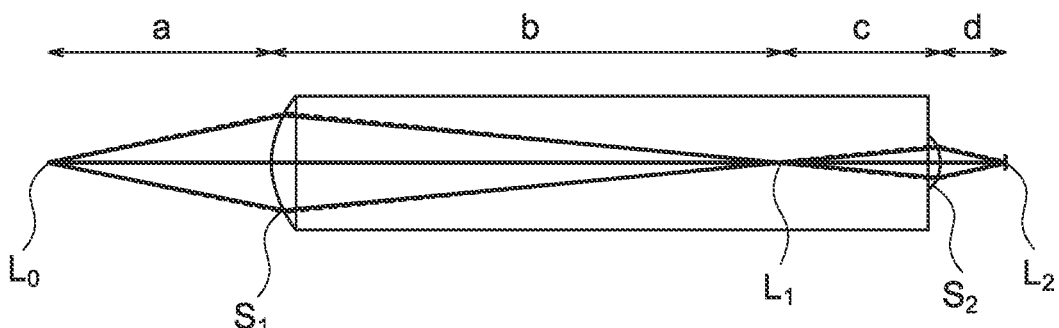
FIG. 13 shows optical paths passing through the optical unit of the Example 2 in operation.

FIG. 13 shows optical paths passing through the optical unit of the Example 2 in operation. The optical unit of the Example 2 is provided with a surface for incident light $S_1$ designed to face a light source $L_0$ and a surface for outgoing light $S_2$ designed to face an element for receiving light so as to optically connect the light source $L_0$ and the element for receiving light. The optical unit of the Example 2 is an optical unit for transmission. The light source is a VCSEL and the element for receiving light is an optical fiber. The optical unit of the Example 2 is not provided with a reflecting surface R therein. A light beam emitted by the VCSEL forms an image (a first image) $L_1$ of the light source inside the optical unit, then passes through the surface for outgoing light $S_2$ and then forms an image (a second image) $L_2$ of the light source $L_0$ in the vicinity of an end surface of the optical fiber. In the optical system shown in FIG. 13, the plane of the light source $L_0$ and the plane of the second image $L_2$ are conjugate to each other. In FIG. 13 the solid line represents a ray of light emitted at the center of the light source and the broken line represents a ray of light emitted at the point that is 5 μm away from the center of the light source.

Figure 14:
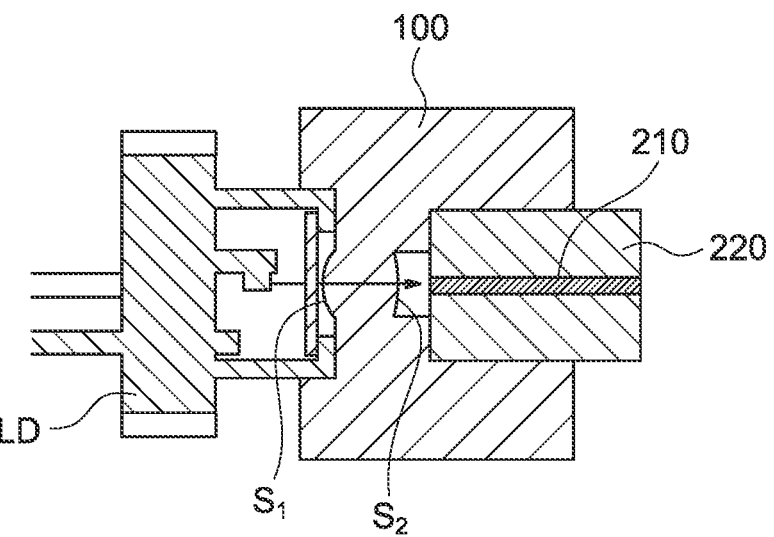
FIG. 14 shows an example of a cross section containing optical paths passing through an optical unit that is not provided with a reflecting surface like the optical unit of Example 2.

FIG. 14 shows an example of a cross section containing optical paths passing through an optical unit that is not provided with a reflecting surface like the optical unit of Example 2. A surface for incident light $S_1$ faces a VCSEL marked with LD and a surface for outgoing light $S_2$ faces an optical fiber 210.

Table 3 shows numerical data used in Expressions (1) to (8) for the optical system of Example 2. The unit of length in Table 3 is millimeter. Further, since a paraxial model of the imaging optical system is employed, the value of sine (sin $\theta_0$) is substantially equal to the value of angle ($\theta_0$) in radian.

TABLE 3

| Item | |
| --- | --- |
| a | 1.000 |
| b | 2.345 |
| c | 0.655 |
| d | 0.291 |
| f1 | 0.590 |
| f2 | 0.166 |
| n | 1.639 |
| sin θ0 | 0.2 |
| NA | 0.2 |
| h0 | 0.005 |
| D | 0.250 |
| hcore | 0.025 |

According to Table 3, Expressions (1) to (3), Expression (7) and Expression (8) are satisfied.

Table 4 shows the shape of each surface, distances between adjacent surfaces and material and a refractive index of each lens of Example 2.

TABLE 4

| | Shape of surface | Radius of curvature [mm] | Cornic constant k | Diameter [mm] | Distance between surafces [mm] | Material | Refractive index n |
| --- | --- | --- | --- | --- | --- | --- | --- |
| Object surface (Light source L0) | Plano | — | — | 0.010 (2 h 0) | 1.000 | Air | 1.000 |
| Surface for incident light S1 | Aspherical | 0.377 | −1.358 | 0.600 | 3.000 | PEI | 1.639 |
| Surface for outgoing light S2 | Aspherical | −0.106 | −1.890 | 0.250 (D) | 0.291 | Air | 1.000 |
| Image plane (End surface of optical fiber) | Plano | — | — | 0.050 (2 hcore) | — | — | — |

How an attenuating portion is formed in the optical unit of Example 2 will be described below. When forming an attenuating portion, the optical unit for transmission is illuminated with a high-power laser beam of a fiber laser or the like from the surface for outgoing light $S_2$ in operation through a ferrule. Since the surface for outgoing light $S_2$ in operation of the optical unit for transmission is designed so as to be connected to an optical fiber through a ferrule in operation, the ferrule used in operation can be used for a fiber laser without any further adjustment when forming the attenuating portion. Thus, alignment of the light source of a high-power laser beam of a fiber laser or the like with the optical unit can be carried out with a high degree of accuracy.

Figure 15:
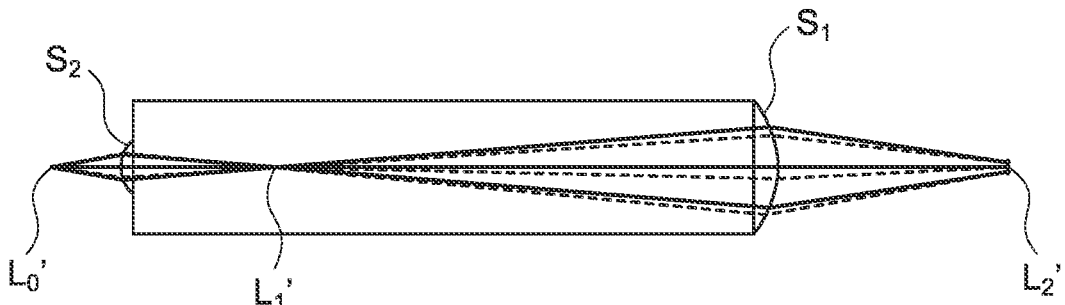
FIG. 15 shows optical paths passing through the optical unit of the Example 2 in a state in which an attenuating portion is formed.

FIG. 15 shows optical paths passing through the optical unit of the Example 2 in a state in which an attenuating portion is formed. In the optical system shown in FIG. 15, a light source $L_0'$ such as a fiber laser is placed substantially at the position of the second image of the optical system shown in FIG. 13. Since in the optical system shown in FIG. 13, the plane of the light source and the plane of the second image are conjugate to each other as described above, in the optical system shown in FIG. 15 an image $L_1'$ of the light source for a high-power laser beam is formed substantially at the position of the first image of the optical system shown in FIG. 13. Accordingly, synthetic resin (plastic) at the position where the image of the light source for a high-power laser beam is formed undergoes a change in refractive index or transmittance so that an attenuating portion is formed. In FIG. 15 the solid line represents a ray of light emitted at the center of the light source and the broken line represents a ray of light emitted at the point that is 5 μm away from the center of the light source.

Figure 16:
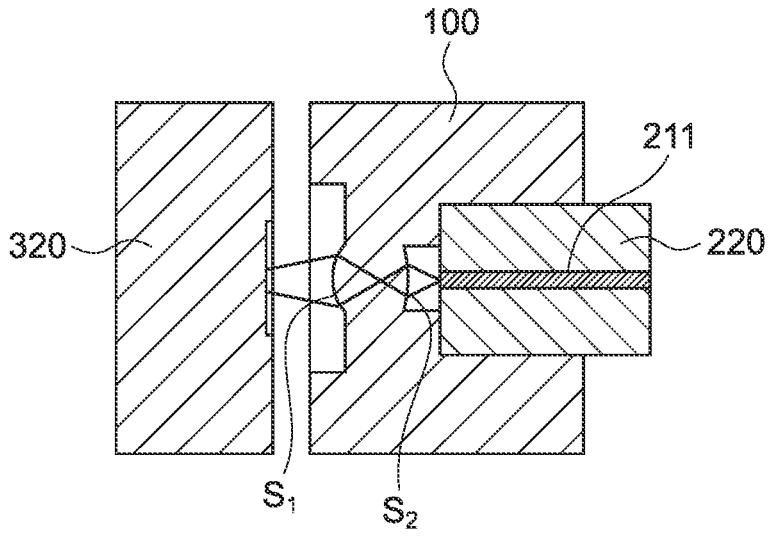
FIG. 16 shows an example of a cross section containing optical paths passing through an optical unit that is not provided with a reflecting surface like the optical unit of Example 2 in a state in which an attenuating portion is formed.

FIG. 16 shows an example of a cross section containing optical paths passing through an optical unit that is not provided with a reflecting surface like the optical unit of Example 2 in a state in which an attenuating portion is formed. A surface for incident light $S_1$ of the optical unit for transmission 100 faces a surface for incident light used for monitoring the quantity of light of a power meter 320 and a surface for outgoing light $S_2$ of the optical unit for transmission 100 faces a fiber laser 211 functioning as a light source.

Method of producing an optical unit provided with an attenuating portion that attenuates the quantity of light passing therethrough.

FIG. 17 is a flowchart for describing a method of producing an optical unit provided with a surface for incident light designed to face a light source and a surface for outgoing light designed to face an element for receiving light so as to optically connect the light source and the element for receiving light from the light source and further provided with an attenuating portion that attenuates the quantity of light passing therethrough.

In step S1010 in FIG. 17, an optical unit is produced. The shape of the optical unit is determined in such a way that a light beam from the light source that has entered the optical unit through a surface for incident light forms a first image of the light source inside the optical unit and forms a second image of the light source outside the optical unit after the light beam has passed through a surface for outgoing light.

By determining the shape of the optical unit so as to satisfy Expressions (1) to (3), an optical system including light sources, the optical unit and elements for receiving light can be configured in such a way that a light beam from a light source that has entered the optical unit through a surface for incident light forms a first image of the light source inside the optical unit and forms a second image of the light source outside the optical unit after the light beam has passed through a surface for outgoing light. Further, when Expression (7) is satisfied, the light beam is kept within the surface for outgoing light and a surface for receiving light of an element for receiving light. Further, when the element for receiving light is an optical fiber and Expression (8) is satisfied, an optical loss at the optical fiber is not generated.

In step S1020 in FIG. 17, by laser illumination carried out through the surface for incident light or the surface for outgoing light, an attenuating portion for attenuating the quantity of light passing therethrough is formed in the vicinity of the position at which the first image is formed. As a light source of laser, a fiber laser should preferably be used and the laser illumination should preferably be made through a surface designed to face an optical fiber, the surface being either the surface for incident light or the surface for outgoing light. By the use of a ferrule used in operation, the position to be illuminated by the fiber laser can be determined with a high degree of accuracy.

In the case of an optical unit for transmission, when forming an attenuating portion, a fiber laser is placed so as to face the surface for outgoing light as an optical fiber is placed in operation. By placing the fiber laser substantially at the position of the second image, the attenuating portion can be formed in the vicinity of the first image. In the case of an optical unit for reception, when an attenuating portion is formed, a fiber laser is placed so as to face the surface for incident light as an optical fiber is placed in operation. By placing the fiber laser at the position where the optical fiber is placed in operation, the attenuating portion can be formed in the vicinity of the first image.

By way of example, the power of a fiber laser is in the rage from 20 kW to 70 kW.

In general, material of an optical unit should preferably be synthetic resin (plastic) such as PEI (polyetherimide), PI (polyimide) and PESU (PES) (polyether sulfone). An optical unit can be molded in one piece using the material described above.

By the methods described above an attenuating portion with any attenuation factor in the range from 0% to 100% can be formed. Usually in the optical communication system, the attenuation factor is in the range from 90% to 25.5% (−0.5 dB to −6.0 dB).

The relationship between the position of the second image of a light source and the position of a surface for incident light will be described below.

FIG. 18 shows an optical system including an optical unit in operation. As described above, an optical system including an optical unit in operation is configured in such a way that the second image $L_2$ of a light source $L_0$ is formed on a surface for incident light of an element for receiving light or an end surface of an optical fiber. In FIG. 18 the position of the second image is represented by A. In the case of an optical unit for transmission, when the end surface of an optical fiber is placed at A, the plane of the light source and the end surface of the optical fiber are conjugate to each other. Accordingly, in the case of an optical unit for transmission, by placing a fiber laser at A and making a laser beam of the fiber laser to converge at the position of the first image in operation, an attenuating portion can be formed at the position.

In FIG. 18 the position where the diameter of a light beam that has passed through the optical unit is minimized is represented by B. The surface for incident light or the end surface of an optical fiber can be placed at B. In this case a tolerance of alignment of the surface for incident light or the end surface of an optical fiber is relatively great.

In the case of an optical unit for transmission, when a fiber laser is placed at B to form an attenuating portion, a light beam of the fiber laser cannot be made to converge at the position of the first image in operation so as to form an attenuating portion. As a consequence, the efficiency of attenuation in operation is reduced. Accordingly, a device such as an adapter is required in order to place a fiber laser at A when forming an attenuating portion.

In the case of an optical unit for reception, a fiber laser is placed at the position where an optical fiber is placed in operation to form an attenuating portion, and the above-described problem arising in the case of an optical unit for transmission will not arise. Accordingly, it is required only to determine the position of the surface for incident light of an element for receiving light in such a way that the diameter of a light beam is smaller than the diameter of the surface for incident light.

Concerning the position of the attenuating portion, "in the vicinity of the position of the first image" means that a distance along the optical axis between each point in the attenuating portion and the position on the optical axis of the first image is in a range between ±15% of the distance along the optical axis between the surface for incident light and the surface for outgoing light of the optical unit. Further, a distance along the optical axis between each point in the attenuating portion and the position on the optical axis of the first image should more preferably be in a range between ±5% of the distance along the optical axis between the surface for incident light and the surface for outgoing light of the optical unit.

In operation "a second image of the light source is formed in the vicinity of a surface of incident light" means that the second image of the light source is formed at such a position on the optical axis that a surface of incident light of an element for receiving light can receive a sufficient quantity of light from a light beam.

What is claimed is:

1. An optical unit of plastic provided with a surface for incident light and a surface for outgoing light, wherein the surface for incident light is designed to face a light source and the surface for outgoing light is designed to face an element for receiving light so as to optically connect the light source and the element for receiving light, the light coming from the light source and wherein the optical unit is so shaped that light that comes from the light source and is incident on the surface for incident light forms a first image of the light source within the optical unit and a second image of the light source after having gone through the surface for outgoing light and the optical unit is provided with an attenuating portion for attenuating the quantity of light passing therethrough with a desired attenuation factor in a range from −0.5 dB to −6.0 dB in the vicinity of the position where the first image is formed, and wherein plastic in the attenuating portion has been made to undergo a change in at least one of a value of refractive index and a value of transmittance.

2. The optical unit according to claim 1, wherein at least one of the surface for incident light and the surface for outgoing light is designed to face an optical fiber through a ferrule.

3. The optical unit according to claim 1, wherein the relationships $$0 < f_1 < a,$$

$$0 < f_2 < d \quad \text{and}$$

$$1 > \frac{naf_1}{a - f_1}$$

are satisfied, where a path of a ray of light passing through the center of the surface for incident light and the center of the surface for outgoing light is defined as an optical axis, a distance along the optical axis in design between the light source and the surface for incident light is represented by a, a distance along the optical axis in design between the surface for incident light and the surface for outgoing light is represented by 1, a distance along the optical axis in design between the surface for outgoing light and the second image of the light is represented by d, a focal length of the surface for incident light on the side of the light source is represented by $f_1$, a focal length of the surface for outgoing light on the side of the element for receiving light is represented by $f_2$ and a refractive index of the optical unit is represented by n.

4. A method of producing an optical unit of plastic provided with a surface for incident light, a surface for outgoing light and an attenuating portion therein, wherein the surface for incident light is designed to face a light source and the surface for outgoing light is designed to face an element for receiving light so as to optically connect the light source and the element for receiving light, the light coming from the light source, the method comprising:

shaping the optical unit in such a way that light that comes from the light source and is incident on the surface for incident light forms a first image of the light source within the optical unit and a second image of the light source after having gone through the surface for outgoing light and making plastic in the vicinity of the position where the first image is formed undergo a change in at least one of a value of refractive index and a value of transmittance, using laser that is made to come through the surface for incident light or the surface for outgoing light so as to form the attenuating portion with a desired attenuation factor in the vicinity of the position where the first image is formed.

5. The method of producing an optical unit according to claim 4, wherein at least one of the surface for incident light and the surface for outgoing light is designed to face an optical fiber through a ferrule and when forming the attenuating portion, laser is made to come through the ferrule and the surface for incident light or the surface for outgoing light.

6. The method of producing an optical unit according to claim 4, wherein the optical unit is an optical unit for reception and when forming the attenuating portion, laser is made to come through the surface for incident light by a fiber laser placed at the position of an optical fiber in operation.

7. The method of producing an optical unit according to claim 4, wherein the optical unit is an optical unit for transmission and when forming the attenuating portion, laser is made to come through the surface for outgoing light by a fiber laser placed substantially at the position of the second image in operation.

* * * * *